United States Patent
Yoshida

(10) Patent No.: US 9,415,677 B2
(45) Date of Patent: Aug. 16, 2016

(54) AIR INTAKE TEMPERATURE SENSOR ARRANGEMENT

(71) Applicant: YAMAHA HATSUDOKI KABUSHIKI KAISHA, Iwata-shi, Shizuoka (JP)

(72) Inventor: Yuhya Yoshida, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 210 days.

(21) Appl. No.: 14/147,619

(22) Filed: Jan. 6, 2014

(65) Prior Publication Data
US 2014/0291051 A1 Oct. 2, 2014

(30) Foreign Application Priority Data

Mar. 26, 2013 (JP) .................... 2013-065054

(51) Int. Cl.
| | |
|---|---|
| B62J 17/08 | (2006.01) |
| B60K 11/04 | (2006.01) |
| F02M 35/10 | (2006.01) |
| F02M 35/16 | (2006.01) |
| F01P 5/06 | (2006.01) |
| B62M 7/04 | (2006.01) |
| F02B 61/02 | (2006.01) |

(52) U.S. Cl.
CPC ............ *B60K 11/04* (2013.01); *B62M 7/04* (2013.01); *F01P 5/06* (2013.01); *F02M 35/1038* (2013.01); *F02M 35/162* (2013.01); *B62K 2207/00* (2013.01); *F02B 61/02* (2013.01)

(58) Field of Classification Search
CPC ....... F01P 7/06; F01P 11/00; B62J 2017/086; E06B 2007/023
See application file for complete search history.

(56) References Cited

U.S. PATENT DOCUMENTS

| | | | | |
|---|---|---|---|---|
| 5,002,019 | A * | 3/1991 | Klaucke | F01P 7/02 123/41.12 |
| 5,915,344 | A * | 6/1999 | Suzuki | F01P 7/08 123/41.11 |
| 2007/0089923 | A1 | 4/2007 | Oohashi et al. | |
| 2008/0223643 | A1* | 9/2008 | Arimura | B62J 17/02 180/229 |
| 2009/0255489 | A1* | 10/2009 | Fujiwara | F01P 11/04 123/41.57 |
| 2010/0078242 | A1* | 4/2010 | Suzuki | B60K 11/04 180/68.6 |
| 2011/0073063 | A1* | 3/2011 | Tadokoro | F02F 7/006 123/195 C |
| 2013/0168039 | A1* | 7/2013 | Arai | B62M 7/02 165/41 |

FOREIGN PATENT DOCUMENTS

| | | | |
|---|---|---|---|
| JP | 08085485 A | * | 4/1996 |
| JP | 11-165680 A | | 6/1999 |
| JP | 2007-112312 A | | 5/2007 |

* cited by examiner

*Primary Examiner* — Joseph Rocca
*Assistant Examiner* — Daniel Yeagley
(74) *Attorney, Agent, or Firm* — Keating and Bennett, LLP

(57) ABSTRACT

A motorcycle includes a body frame, an engine supported by the body frame, a radiator disposed in front of the engine, a radiator fan disposed between the engine and the radiator, a left frame cover disposed above the radiator, and an intake air temperature sensor mounted to the left frame cover. The radiator fan rotates clockwise as viewed from the front of the vehicle, and the intake air temperature sensor is positioned above a right end of the radiator as viewed from the front of the vehicle.

9 Claims, 12 Drawing Sheets

AIR INTAKE TEMPERATURE SENSOR ARRANGEMENT

The present application claims priority from Japanese Patent Application No. 2013-65054, filed on Mar. 26, 2013, which is incorporated by reference herein in its entirety.

BACKGROUND OF THE INVENTION

1. Field of the Invention

The present invention relates to motorcycles.

2. Description of the Related Art

In the field of motorcycles, it has been a common practice to detect the temperature of the air to be sucked into the engine, i.e., intake air temperature, by an intake air temperature sensor that is mounted on the vehicle body, as described in JP H11 (1999)-165680 A and JP 2007-112312 A, for example.

In addition, motorcycles equipped with water-cooled engines are known. A motorcycle equipped with a water-cooled engine includes a radiator to supply coolant to the engine. The radiator is arranged to release the heat conveyed by coolant to the atmosphere and to cool the coolant, and is disposed in front of the engine in many cases. When the intake air temperature sensor is disposed near the radiator or the engine, the intake air temperature sensor is affected by the heat emitted from the radiator and so forth, so the intake air temperature may not be measured accurately. For this reason, the intake air temperature sensor is in many cases disposed at a position away from sources of heat, such as the radiator and the engine. In the techniques described in JP H11 (1999)-165680 A and JP 2007-112312 A, the intake air temperature sensor is disposed in front of and away from the radiator, the engine, and so forth.

In a motorcycle, the space for installing various components such as the intake air temperature sensor is limited. In some cases, the intake air temperature sensor cannot be disposed at a position spaced away from a heat source, such as the radiator and the engine. There has been a demand to measure the intake air temperature more accurately in such cases.

SUMMARY OF THE INVENTION

In view of the foregoing and other problems, preferred embodiments of the present invention provide a motorcycle that makes it possible to measure the intake air temperature more accurately in the case where the intake air temperature sensor is disposed near a heat source such as the radiator and the engine.

A motorcycle according to a preferred embodiment of the present invention includes a body frame, an engine supported by the body frame, a radiator disposed in front of the engine, a radiator fan disposed between the engine and the radiator and configured to pass air through the radiator from the front of the radiator, a frame cover disposed above the radiator, and an intake air temperature sensor mounted to the frame cover, wherein the radiator fan rotates clockwise as viewed from a front of the vehicle and the intake air temperature sensor is positioned above a right end of the radiator as viewed from the front of the vehicle, or the radiator fan rotates counterclockwise as viewed from the front of the vehicle and the intake air temperature sensor is positioned above a left end of the radiator as viewed from the front of the vehicle.

In the motorcycle according to a preferred embodiment of the present invention, when the radiator fan rotates clockwise as viewed from the front of the vehicle, the intake air temperature sensor is positioned above the right end of the radiator as viewed from the front of the vehicle. In this case, the air having been heated by passing through the radiator tends to flow toward an upper region from the left end of the radiator and a lower region of the right end of the radiator by the radiator fan. However, the intake air temperature sensor is positioned at a location above the right end of the radiator, where it is difficult for the heated air to flow. For this reason, when the intake air temperature sensor measures the intake air temperature, the air heated by the radiator has less of an effect on the measured temperature. As a result, the intake air temperature sensor measures the temperature of the air more accurately. On the other hand, in the motorcycle according to a preferred embodiment of the present invention, when the radiator fan rotates counterclockwise as viewed from the front of the vehicle, the intake air temperature sensor is positioned above the left end of the radiator as viewed from the front of the vehicle. In this case, the air having been heated by passing through the radiator tends to flow toward an upper region from the right end of the radiator and a lower region of the left end of the radiator by the radiator fan. However, the intake air temperature sensor is positioned at a location above the left end of the radiator, where it is difficult for the heated air to flow. For this reason, when the intake air temperature sensor measures the intake air temperature, the air heated by the radiator has less of an effect on the measured temperature. As a result, the intake air temperature sensor measures the temperature of the air more accurately. Thus, the above-described motorcycle makes it possible to measure the intake air temperature more accurately even when the intake air temperature sensor is disposed near the radiator.

In a preferred embodiment of the present invention, the intake air temperature sensor may be positioned more rearward than a front end of the radiator and more frontward than a rear end of the radiator.

Thus, the intake air temperature is measured more accurately even when the intake air temperature sensor is disposed near the radiator.

In a preferred embodiment of the present invention, an upper end of the radiator is positioned more frontward than a lower end of the radiator, and the intake air temperature sensor is disposed in a region rearward of, as viewed from one side of the vehicle, a first linear line connecting the upper end of the radiator and the lower end of the radiator to each other and extending frontward and obliquely upward, and above a second linear line passing through the center of the radiator and extending rearward and obliquely upward perpendicularly to the first linear line.

Thus, the intake air temperature is measured more accurately even when the intake air temperature sensor is disposed above the radiator.

In a preferred embodiment of the present invention, the motorcycle further includes a head pipe, the body frame includes a main frame extending rearward and obliquely downward from the head pipe, and the frame cover is mounted to the main frame.

By mounting the frame cover to the main frame in this manner, the intake air temperature sensor is disposed at a position in which it is difficult for the heated air to flow.

In a preferred embodiment of the present invention, the radiator fan rotates clockwise as viewed from the front of the vehicle, and the motorcycle further includes a cover, at least a portion of which is positioned above and behind a left portion of the radiator fan as viewed from the front of the vehicle, wherein the cover opens downward.

Thus, the cover corresponding to the radiator fan rotating clockwise is provided behind the radiator fan. Therefore, the air heated by passing through the radiator is more unlikely to flow toward the intake air temperature sensor. As a result, the temperature of the air is measured more accurately.

In a preferred embodiment of the present invention, the motorcycle further includes a left front fork and a right front fork both mounted to the body frame, and a front wheel supported by the left front fork and the right front fork, wherein the radiator fan rotates clockwise as viewed from the front of the vehicle and the intake air temperature sensor is disposed above the right end of the radiator and rightward of the left front fork.

Thus, the intake air temperature is measured more accurately even when the intake air temperature sensor is disposed near the radiator.

In a preferred embodiment of the present invention, the radiator fan rotates counterclockwise as viewed from the front of the vehicle, and the motorcycle further includes a cover, at least a portion of which is positioned above and behind a right portion of the radiator fan as viewed from the front of the vehicle, wherein the cover opens downward.

Thus, the cover corresponding to the radiator fan rotating counterclockwise is provided behind the radiator fan. Therefore, the air heated by passing through the radiator is more unlikely to flow toward the intake air temperature sensor. As a result, the temperature of the air is measured more accurately.

In a preferred embodiment of the present invention, the motorcycle further includes a left front fork and a right front fork both mounted to the body frame, and a front wheel supported by the left front fork and the right front fork, wherein the radiator fan rotates counterclockwise as viewed from the front of the vehicle and the intake air temperature sensor is disposed above the left end of the radiator and leftward of the right front fork as viewed from the front of the vehicle.

Thus, the intake air temperature is measured more accurately even when the intake air temperature sensor is disposed near the radiator.

In a preferred embodiment of the present invention, the radiator is inclined frontward and obliquely upward, and an inclination angle of the radiator from the horizontal is greater than about 45 degrees, for example.

When the inclination angle of the radiator from the horizontal is greater than about 45 degrees, the heated air tends to flow toward an upper region from the left end of the radiator as viewed from the front of the vehicle in the case where the radiator fan rotates clockwise, or toward an upper region located upward from the right end of the radiator as viewed from the front of the vehicle in the case where the radiator fan rotates counterclockwise. However, the intake air temperature sensor is disposed at a position to which it is difficult for the air heated by passing through the radiator to flow, and therefore, the intake air temperature is measured more accurately.

As described above, preferred embodiments of the present invention provide a motorcycle that makes it possible to measure the intake air temperature more accurately in the case where the intake air temperature sensor is disposed near a heat source such as the radiator and the engine.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
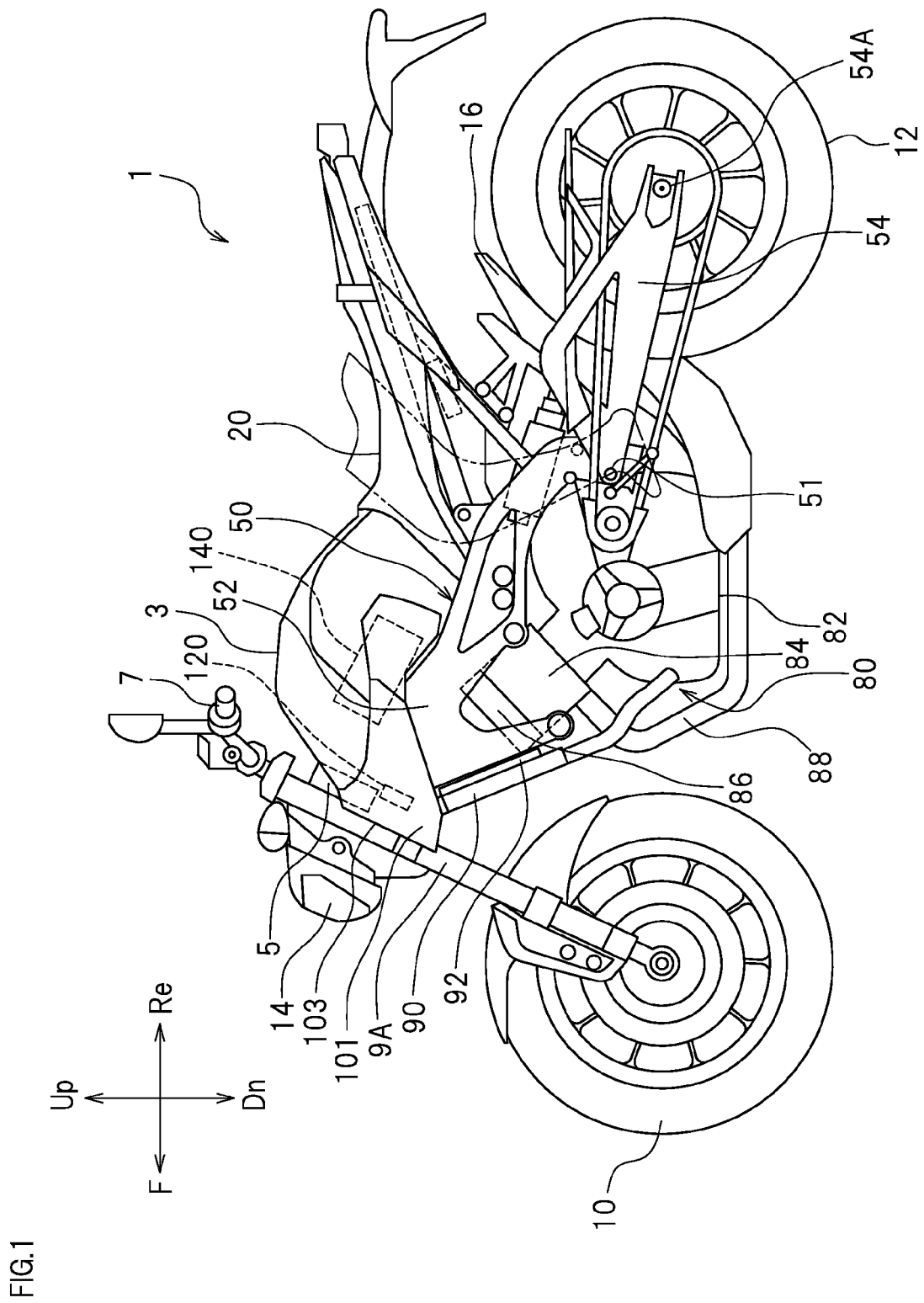
FIG. 1 is a left side view illustrating a motorcycle according to a first preferred embodiment of the present invention.

Hereinbelow, preferred embodiments of the present invention will be described. As illustrated in FIG. 1, a motorcycle 1 according to the present preferred embodiment is preferably an on-road type motorcycle 1, for example. It should be noted, however, that the motorcycle according to preferred embodiments of the present invention is not limited to the on-road type motorcycle 1. The motorcycle according to preferred embodiments of the present invention may be any other type of motorcycle, such as a moped type motorcycle, an off-road type motorcycle, or a scooter type motorcycle, for example.

In the following description, the terms "front," "rear," "left," and "right" respectively refer to front, rear, left, and right as defined based on the perspective of the rider of the motorcycle 1. Reference characters F, Re, L, and R in the drawings indicate front, rear, left, and right, respectively. The terms "above/up" and "below/down" respectively mean the relative positions above/up and below/down as used when the motorcycle 1 is stationary on a horizontal plane. Reference characters Up and Dn used in the drawings indicate vertically upward and vertically downward, respectively. Furthermore, regarding a radiator 90 and a radiator fan 92, the terms "left" and "right" respectively mean left and right as viewed from the front of the vehicle.

As illustrated in FIG. 1, the motorcycle 1 includes a fuel tank 3, a seat 20, an engine 80 that is preferably an internal combustion engine, and a body frame 50 to support the above-mentioned components. A head pipe 5 is provided at the front of the body frame 50. A headlight 14 is disposed more frontward than the head pipe 5. A steering shaft (not shown) is supported on the head pipe 5, and a handlebar 7 is provided on an upper portion of the steering shaft. A pair of front forks, a left front fork 9A and a right front fork 9B (see FIG. 2), are provided on a lower portion of the steering shaft. A front wheel 10 is supported rotatably at lower end portions of the front fork 9A and the front fork 9B.

Figure 4:
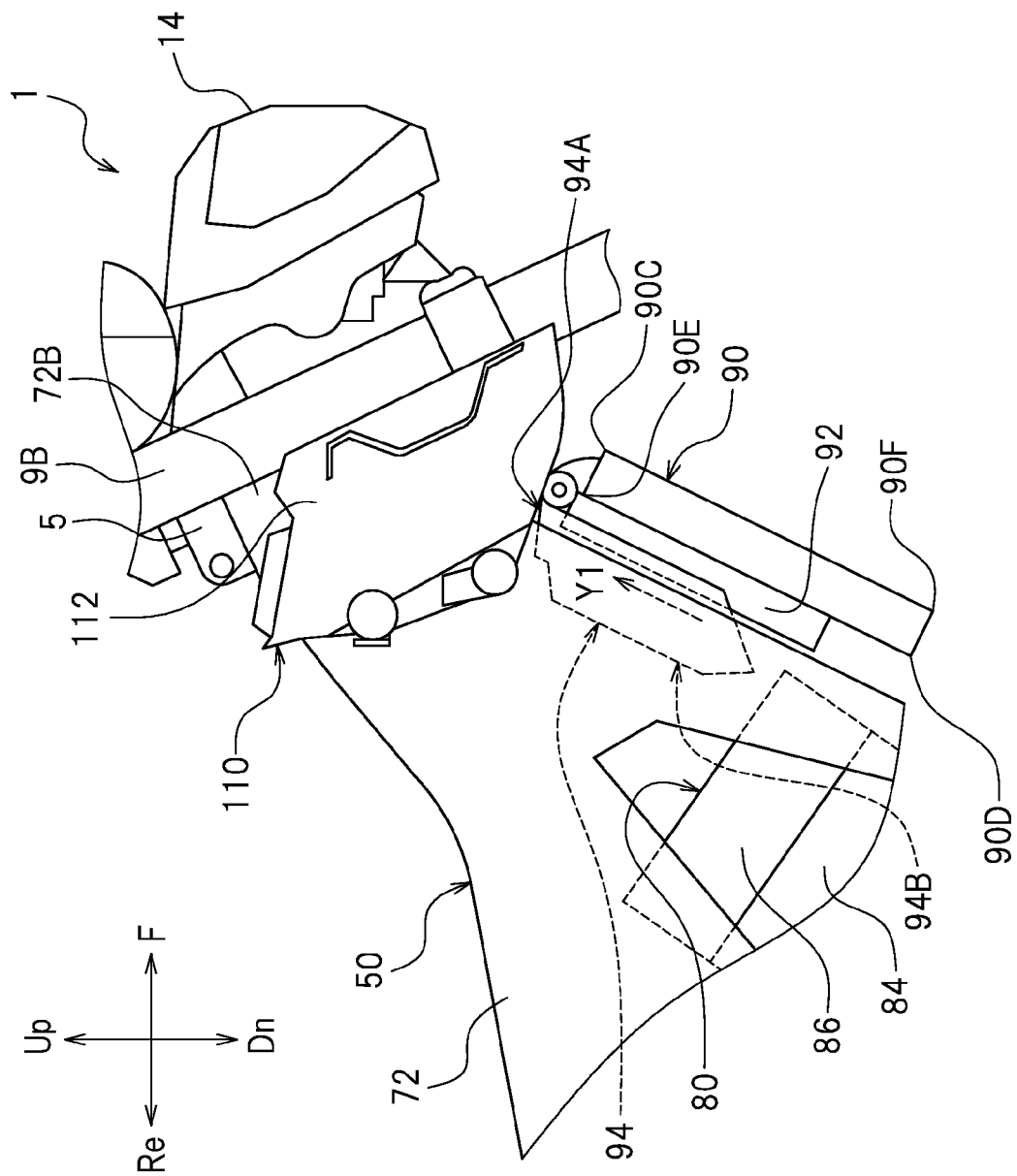
FIG. 4 is a right side view illustrating a portion of the motorcycle according to the first preferred embodiment of the present invention.

The body frame 50 includes a left main frame 52, a right main frame 72 (see FIG. 4), a left rear arm 54, a right rear arm (not shown), and a cross member (not shown). As illustrated in FIG. 1, the left main frame 52 extends rearward and obliquely downward from the head pipe 5. As illustrated in FIG. 4, the right main frame 72 extends rearward and obliquely downward from the head pipe 5. The right main frame 72 is positioned to the right of the left main frame 52. As illustrated in FIG. 1, the left main frame 52 and the left rear arm 54 are coupled to each other via a pivot shaft 51. The right main frame 72 and the right rear arm are coupled to each other via the pivot shaft 51. The cross member is disposed so as to span across the left main frame 52 and the right main frame 72. The left main frame 52 and the right main frame 72 are preferably made of aluminum.

As illustrated in FIG. 1, a rear wheel 12 is rotatably supported at a rear end portion 54A of the left rear arm 54 and a rear end portion of the right rear arm. A rear fender 16 is disposed above a portion of the rear wheel 12. The rear fender 16 is supported by the left rear arm 54 and the right rear arm.

The engine 80 is disposed under the left main frame 52 and the right main frame 72. The engine 80 is supported non-swingably by the left main frame 52 and the right main frame 72. The engine 80 includes a crankcase 82, a cylinder block 84 extending frontward and obliquely upward from the crankcase 82, a cylinder head 86 connected to an upper portion of the cylinder block 84, and a cylinder head cover (not shown) connected to an upper portion of the cylinder head 86.

Figure 3:
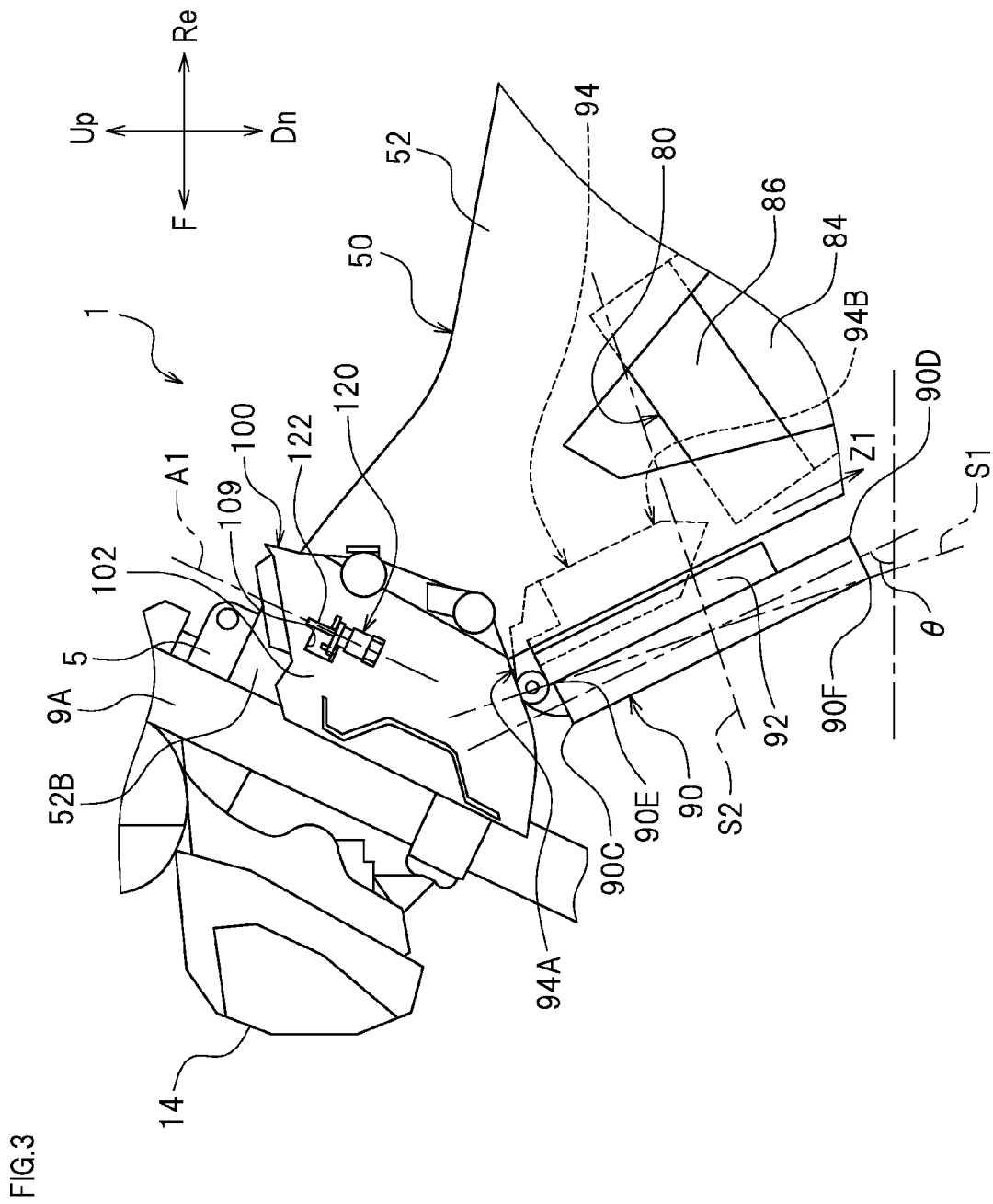
FIG. 3 is a left side view illustrating a portion of the motorcycle according to the first preferred embodiment of the present invention.

As illustrated in FIG. 3, a rectangular or substantially rectangular shaped radiator 90 is disposed in front of the engine 80. A radiator fan 92 is disposed between the engine 80 and the radiator 90. The radiator fan 92 causes the air to pass through the radiator 90 forcibly from the front of the radiator 90. A fan cover 94 is disposed between the radiator fan 92 and the engine 80. The radiator fan 92 and the fan cover 94 are mounted to the radiator 90.

Figure 2:
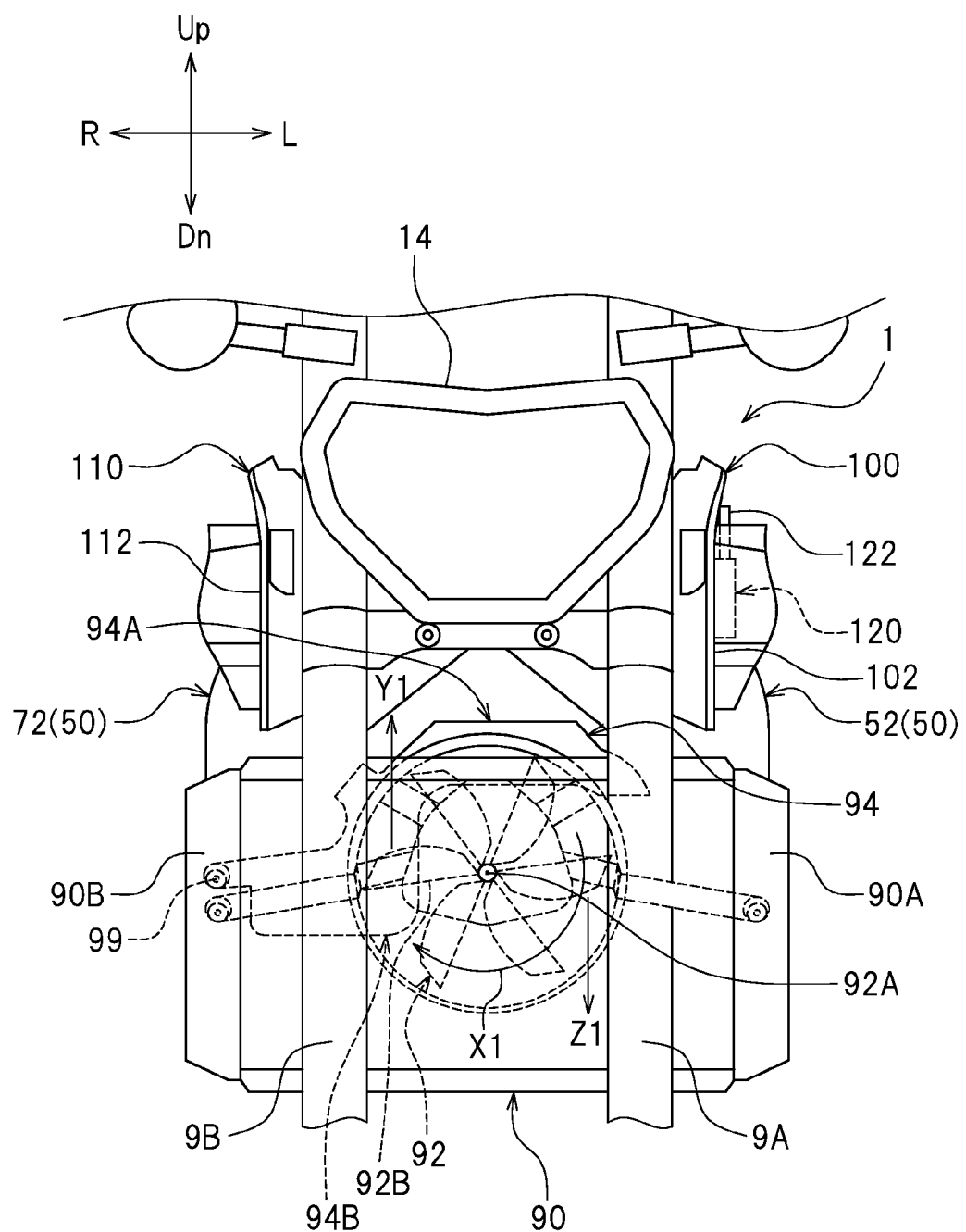
FIG. 2 is a front view illustrating a portion of the motorcycle according to the first preferred embodiment of the present invention.

As illustrated in FIG. 2, the radiator 90 is positioned lower than the headlight 14. The radiator 90 is positioned at the rear of the left front fork 9A and the right front fork 9B. As illustrated in FIG. 3, the radiator 90 is inclined frontward and obliquely upward. The front end 90C of the radiator 90 is positioned more frontward than the rear end 90D of the radiator 90. The inclination angle θ of the radiator 90 from a horizontal direction is greater than about 45 degrees, for example.

As illustrated in FIG. 2, the radiator fan 92 rotates clockwise as viewed from the front of the vehicle (in the direction indicated by arrow X1 in FIG. 2). Accordingly, the air having been heated by passing through the radiator 90 tends to flow to the left and upward from the radiator fan 92 as viewed from the front of the vehicle (i.e., in the direction indicated by arrow Y1 in FIGS. 2 and 4) and to the right and downward from the radiator fan 92 as viewed from the front of the vehicle (i.e., in the direction indicated by arrow Z1 in FIGS. 2 and 3).

Figure 9:
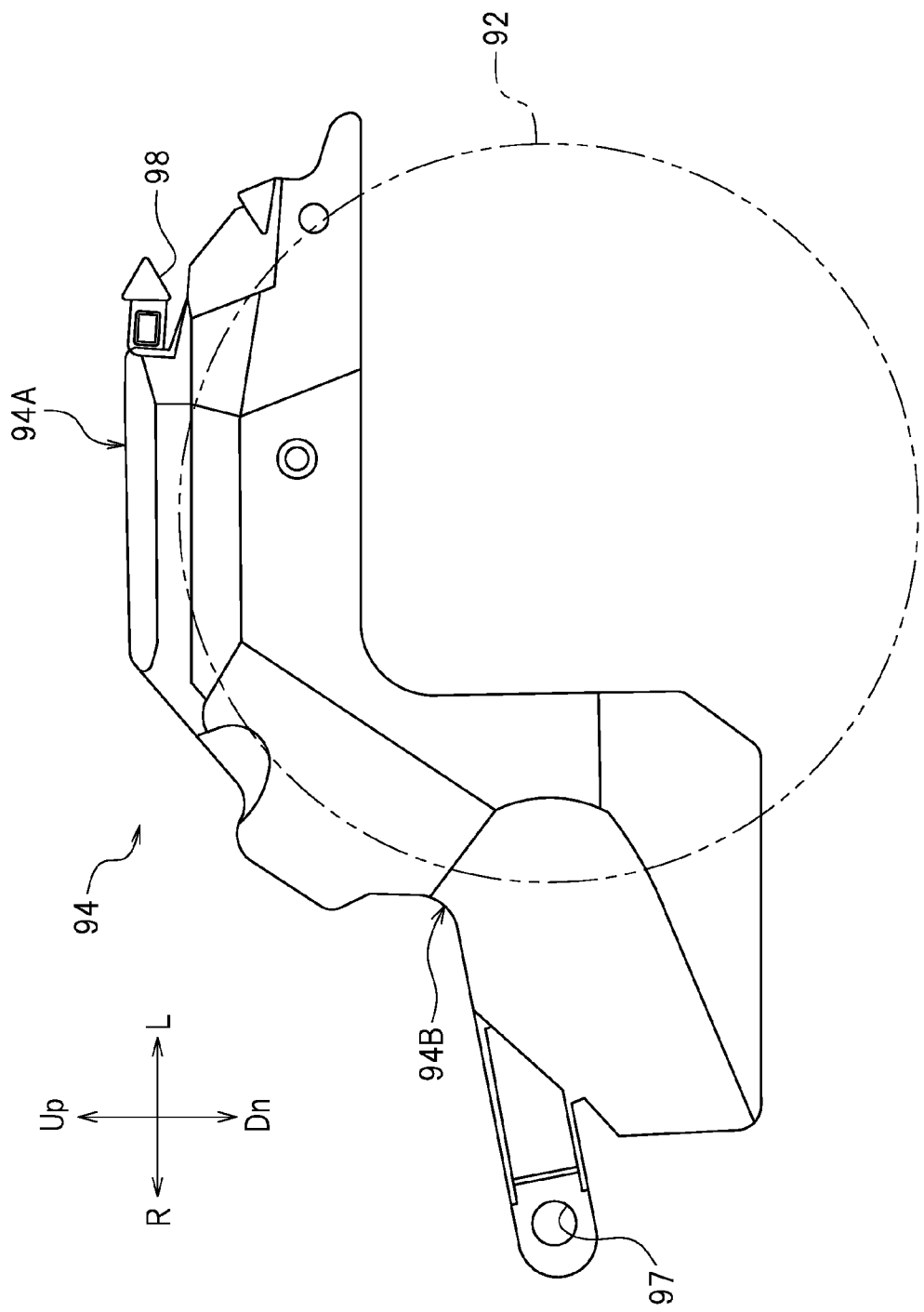
FIG. 9 is a front view illustrating a fan cover according to the first preferred embodiment of the present invention.
Figure 10:
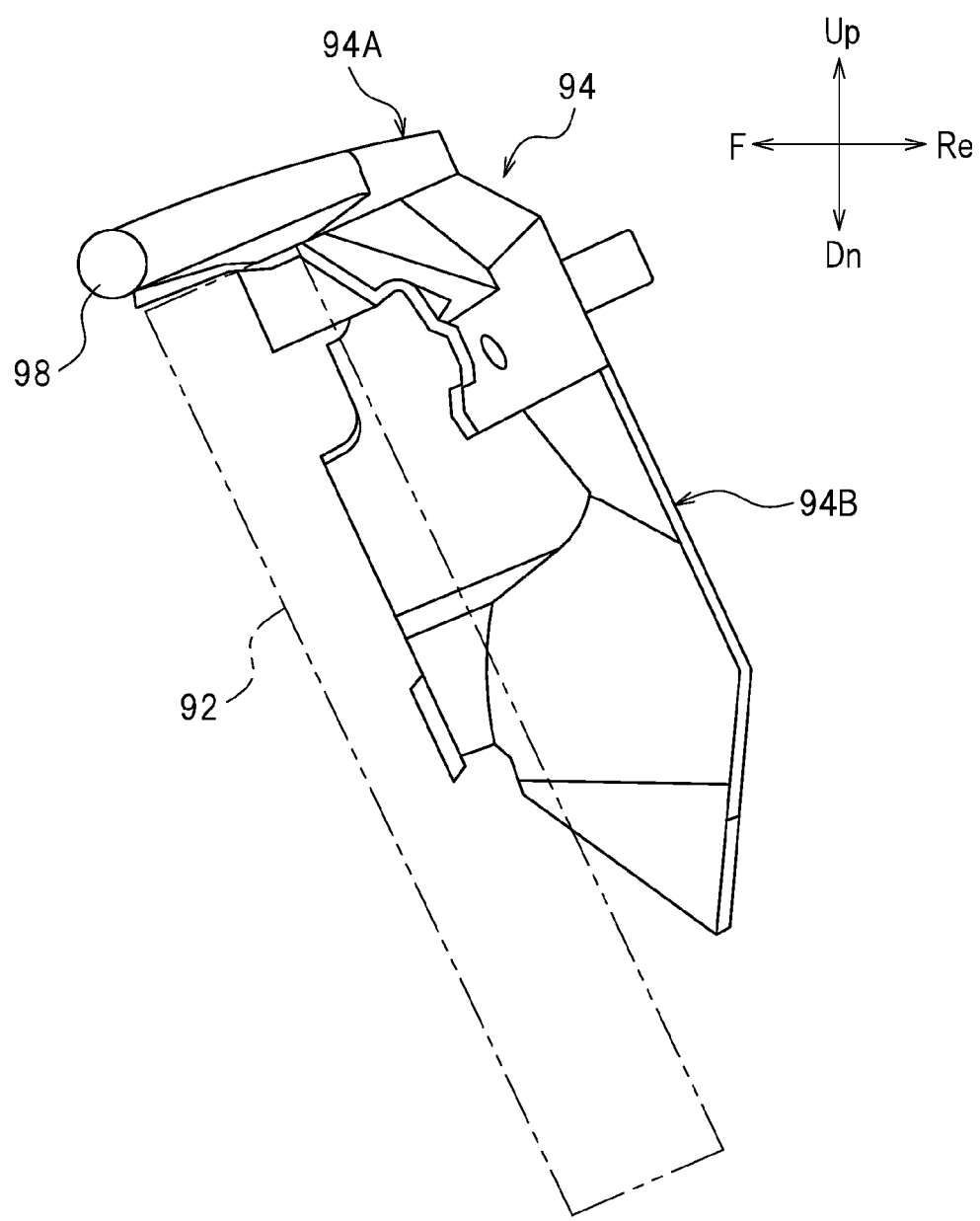
FIG. 10 is a left side view illustrating the fan cover according to the first preferred embodiment of the present invention.

As illustrated in FIG. 2, the fan cover 94 includes an upper portion 94A positioned above the radiator fan 92, as viewed from the front of the vehicle, and a side portion 94B positioned leftward of the radiator fan 92, as viewed from the front of the vehicle. At least a portion of the upper portion 94A of the fan cover 94 is positioned above and behind the radiator fan 92. At least a portion of the side portion 94B of the fan cover 94 is positioned leftward of and behind the radiator fan 92, as viewed from the front of the vehicle. The fan cover 94 opens downward. As illustrated in FIG. 9, a hole 97 is provided in the side portion 94B. As illustrated in FIG. 2, the fan cover 94 is secured to a left end 90B of the radiator 90 preferably using a screw 99 screwed in the hole 97. As illustrated in FIG. 10, a protruding portion 98 protruding rightward from the fan cover 94, as viewed from the front of the vehicle, is provided on the upper portion 94A. The fan cover 94 is secured to the upper end of the radiator 90 by inserting the protruding portion 98 into a rubber grommet (not shown) provided at the upper end of the radiator 90. Note that at least a portion of the fan cover 94 should be positioned above and behind a left portion 92B of the radiator fan 92. The left portion 92B of the radiator fan 92 includes a portion of the radiator fan 92 that is located more leftward than the center 92A of the radiator fan 92, as viewed from the front of the vehicle. When viewed from the rider of the motorcycle 1, the left portion 92B of the radiator fan 92 is a portion thereof that is located more rightward than the center 92A of the radiator fan 92. The method of securing the fan cover 94 to the radiator 90 is not limited to the above-described method. For example, the fan cover 94 may be secured to the radiator 90 using bolts and nuts.

Figure 5:
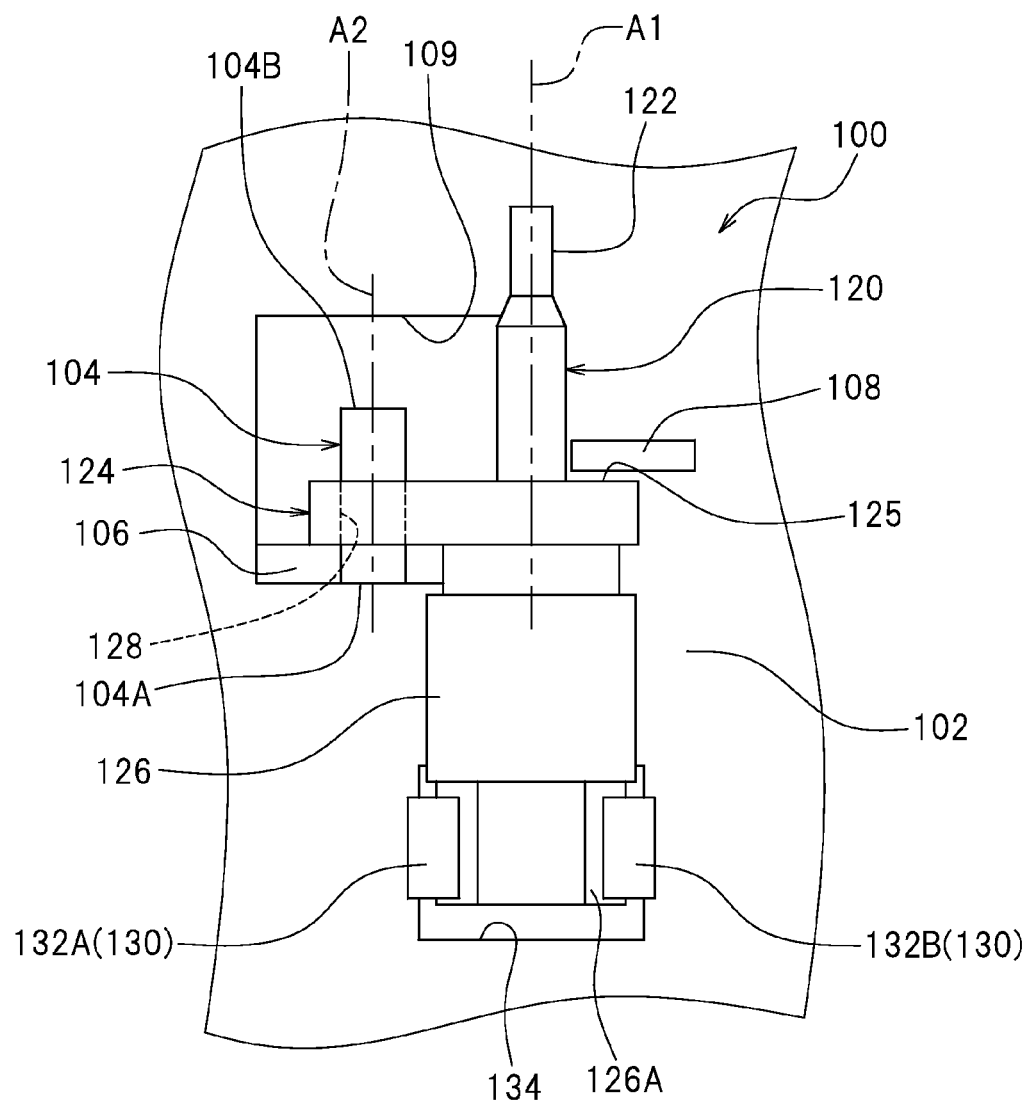
FIG. 5 is a left side view illustrating an intake air temperature sensor and a cover main body according to the first preferred embodiment of the present invention.
Figure 7:
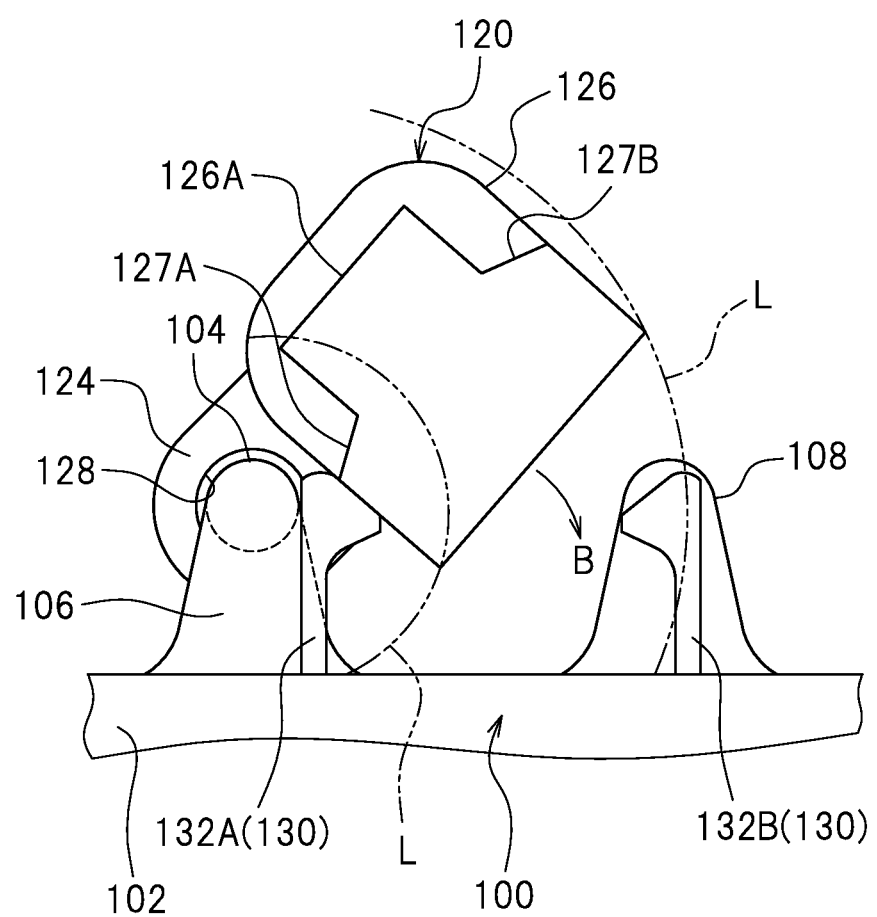
FIG. 7 is a bottom view illustrating how the intake air temperature sensor and the cover main body are fitted to each other according to the first preferred embodiment of the present invention.

As illustrated in FIG. 3, the motorcycle 1 includes an intake air temperature sensor 120. The intake air temperature sensor 120 is mounted to a below-described left frame cover 100. As illustrated in FIG. 5, the intake air temperature sensor 120 includes a rod-shaped sensor main unit 122 that measures the temperature of air. The intake air temperature sensor 120 includes a flange 124 extending in a direction substantially perpendicular to the sensor main unit 122. The intake air temperature sensor 120 includes a closed-bottom case 126 to which the sensor main unit 122 is mounted. As illustrated in FIG. 7, a bottom portion 126A of the case 126 is substantially T-shaped as viewed from the bottom. The bottom portion 126A is provided with a first interlocking portion 127A interlocking with a below-described first hook member 132A and a second interlocking portion 127B interlocking with a second hook member 132B. The flange 124 includes a hole 128 serving as a first engaging portion and having an axis line A2 extending substantially parallel to an axis line A1 of the sensor main unit 122. The flange 124 includes a contact portion 125 that comes into contact with a below-described stop portion 108. The sensor main unit 122 is disposed between the contact portion 125 and the hole 128 of the flange 124.

It should be noted that the phrase "substantially perpendicular to" includes the case in which, for example, the inclination angle of the flange with respect to the sensor main unit is from about 85 degrees to about 95 degrees, in addition to the case in which the flange 124 extends perpendicularly to the sensor main unit 122. The phrase "substantially parallel to" includes the state in which, for example, the inclination angle of the axis line A1 with respect to the axis line A2 is less than about 5 degrees, in addition to the state in which the axis line A1 is parallel to the axis line A2.

As illustrated in FIG. 3, the left frame cover 100 is mounted to a front end portion 52B of the left main frame 52. Note that a left outer cover 101 (see FIG. 1), which is disposed outward (leftward) of the left frame cover 100, is not shown in FIG. 3. As illustrated in FIG. 2, the left frame cover 100 is positioned above the right end 90A of the radiator 90 as viewed from the front of the vehicle. The left frame cover 100 includes a cover main body 102 having a surface. The surface of the cover main body 102 is a substantially vertical surface. Note that, when viewed from the rider of the motorcycle 1, the right end 90A of the radiator 90 is seen as the left end of the radiator 90.

As illustrated in FIG. 4, a right frame cover 110 is mounted to a front end portion 72B of the right main frame 72. Note that a right outer cover, which is disposed outward (rightward) of the right frame cover 110, is not shown in FIG. 4. As illustrated in FIG. 2, the right frame cover 110 is positioned above the left end 90B of the radiator 90 as viewed from the front of the vehicle. The right frame cover 110 includes a cover main body 112 having a surface. The surface of the cover main body 112 is a substantially vertical surface. Note that, when viewed from the rider of the motorcycle 1, the left end 90B of the radiator 90 is seen as the right end of the radiator 90.

As illustrated in FIG. 5, the left frame cover 100 includes a rod-shaped body 104 serving as the second engaging portion and extending substantially parallel to the surface of the cover main body 102. The rod-shaped body 104 is configured so as to be engageable with the hole 128 of the flange 124. The rod-shaped body 104 preferably is provided integrally with the cover main body 102. The rod-shaped body 104 and the hole 128 are engaged with each other so that the intake air temperature sensor 120 can be pivoted relative to the left frame cover 100.

The phrase "substantially parallel to" includes the state in which, for example, the inclination angle of the rod-shaped body 104 with respect to the surface of the cover main body 102 is less than about 5 degrees, in addition to the state in which the rod-shaped body 104 extends parallel to the surface of the cover main body 102.

As illustrated in FIG. 5, the left frame cover 100 includes a coupling portion 106 that couples the cover main body 102 and the rod-shaped body 104 to each other. The coupling portion 106 is interposed between the cover main body 102 and the rod-shaped body 104. One end 104A of the rod-shaped body 104 is continuous with the coupling portion 106. The other end 104B of the rod-shaped body 104 is spaced apart from the cover main body 102. A gap is provided between the cover main body 102 and the other end 104B of the rod-shaped body 104. As illustrated in FIG. 5, the other end 104B of the rod-shaped body 104 is positioned higher than the one end 104A of the rod-shaped body 104.

As illustrated in FIG. 5, the left frame cover 100 includes a stop portion 108 that restricts movement of the flange 124 toward the other end 104B of the rod-shaped body 104. The stop portion 108 protrudes from the surface of the cover main body 102. The stop portion 108 is positioned nearer to the other end 104B of the rod-shaped body 104 than the flange 124. An opening 109 is provided in a portion of the cover main body 102 that faces the rod-shaped body 104.

The left frame cover 100 includes a securing portion 130 that secures the case 126 of the intake air temperature sensor 120. The securing portion 130 is provided on the cover main body 102. As illustrated in FIG. 7, the securing portion 130 is provided on a traveling path L of the case 126 when the intake air temperature sensor 120 is pivoted. The securing portion 130 includes the first hook member 132A and the second hook member 132B both protruding from the surface of the cover main body 102. An opening 134 is provided in a portion of the cover main body 102 that is between the first hook member 132A and the second hook member 132B.

As illustrated in FIG. 2, the intake air temperature sensor 120 is disposed above the right end 90A of the radiator 90 as viewed from the front of the vehicle. The intake air temperature sensor 120 is disposed rightward of the left front fork 9A. As illustrated in FIG. 3, the intake air temperature sensor 120 is disposed more rearward than the front end 90C of the radiator 90 and more frontward than the rear end 90D of the radiator 90. The intake air temperature sensor 120 is disposed in a region rearward of, as viewed from one side of the vehicle, a first linear line S1 connecting the upper end 90E of the radiator 90 and the lower end 90F of the radiator 90 to each other and extending frontward and obliquely upward, and above a second linear line S2 passing through the center of the radiator 90 and extending rearward and obliquely upward perpendicularly to the first linear line S1. The intake air temperature sensor 120 is disposed so that the sensor main unit 122 extends rearward and obliquely upward.

The intake air temperature sensor 120 is mounted to the left frame cover 100 so that the sensor main unit 122 is substantially parallel to the surface of the cover main body 112. By engaging the hole 128 and the rod-shaped body 104 with each other, the intake air temperature sensor 120 is mounted to the left frame cover 100 so that the sensor main unit 122 is substantially parallel to the surface of the cover main body 112. As illustrated in FIG. 3, the intake air temperature sensor 120 is disposed at the rear of the head pipe 5.

The phrase "substantially parallel to" includes the state in which, for example, the inclination angle of the sensor main body 122 with respect to the surface of the cover main body 112 is less than about 5 degrees, in addition to the state in which the sensor main body 122 is parallel to the surface of the cover main body 112.

Figure 6:
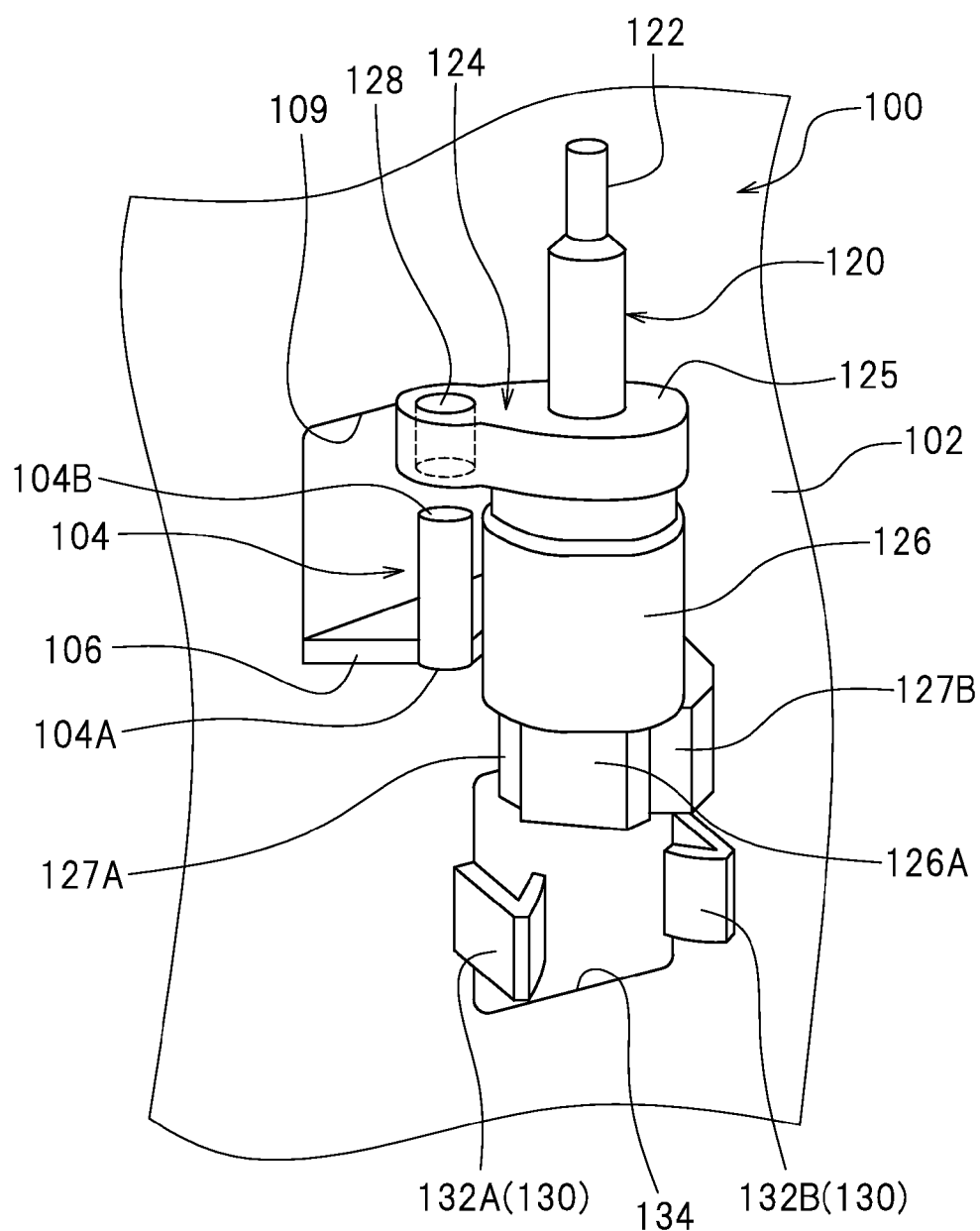
FIG. 6 is a perspective view illustrating the intake air temperature sensor and the cover main body according to the first preferred embodiment of the present invention.
Figure 8:
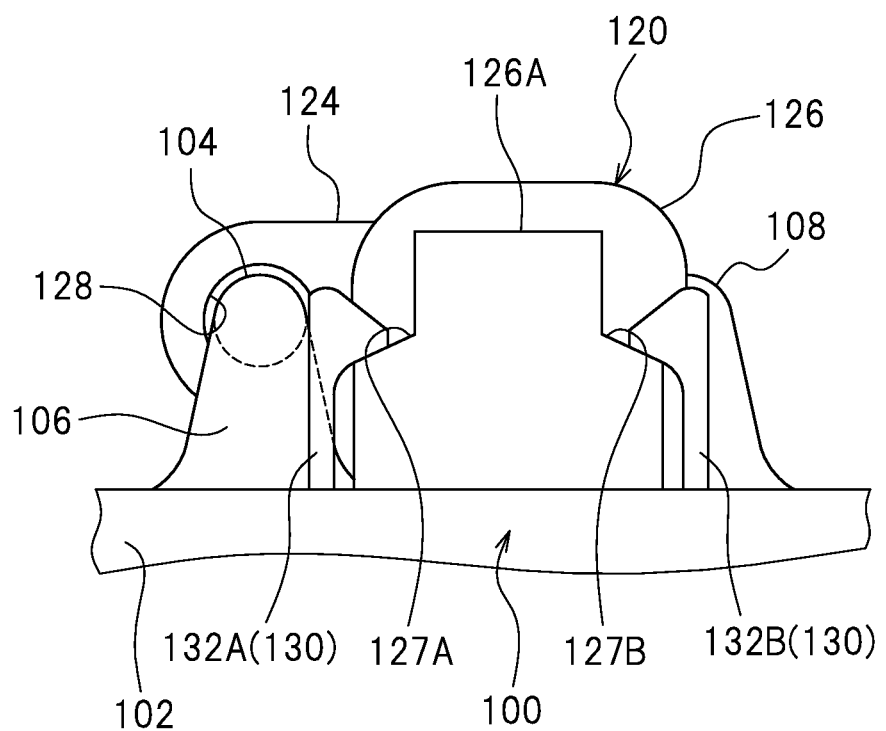
FIG. 8 is a bottom view illustrating how the intake air temperature sensor and the cover main body are fitted to each other according to the first preferred embodiment of the present invention.

Next, the method for mounting the intake air temperature sensor 120 to the left frame cover 100 will be described. As illustrated in FIG. 6, the hole 128 of the flange 124 is engaged with the rod-shaped body 104 provided on the cover main body 102. As illustrated in FIG. 7, when the intake air temperature sensor 120 is pivoted in the direction indicated by arrow B relative to the left frame cover 100, the intake air temperature sensor 120 pivots along a traveling path L of the case 126. As illustrated in FIG. 8, when the intake air temperature sensor 120 comes into contact with the cover main body 102 of the left frame cover 100, the first hook member 132A interlocks with the first interlocking portion 127A and the second hook member 132B interlocks with the second interlocking portion 127B.

As illustrated in FIG. 1, the left outer cover 101 is disposed outward of the left frame cover 100. A right outer cover (not shown) is disposed outward of the right frame cover 110. An air intake port 103 is provided in the left outer cover 101. The air intake port 103 is positioned in front of the intake air temperature sensor 120. An air cleaner 140, into which the air having passed through the air intake port 103 flows, is disposed behind the intake air temperature sensor 120. The air cleaner 140 is disposed below the fuel tank 3.

In the motorcycle 1 according to the present preferred embodiment, the radiator fan 92 rotates clockwise as viewed from the front of the vehicle (i.e., in the direction indicated by arrow X1 in FIG. 2), and the intake air temperature sensor 120 is positioned above the right end 90A of the radiator 90 as viewed from the front of the vehicle, as described above. In this case, the air having been heated by passing through the radiator 90 tends to flow upward of the left end 90B of the radiator 90 as viewed from the front of the vehicle (i.e., in the direction indicated by arrow Y1 in FIG. 2) and downward of the right end 90A of the radiator 90 as viewed from the front of the vehicle (i.e., in the direction indicated by arrow Z1 in FIG. 2) by the radiator fan 92. However, the intake air temperature sensor 120 is disposed above the right end 90A of the radiator 90, where it is difficult for the heated air to flow. For this reason, when the intake air temperature sensor 120 measures the intake air temperature, the air heated by the radiator 90 has less of an effect on the measured temperature. As a result, the intake air temperature sensor 120 measures the temperature of the air more accurately. Thus, the motorcycle 1 makes it possible to measure the intake air temperature more accurately even when the intake air temperature sensor 120 is disposed near the radiator 90.

In the present preferred embodiment, the intake air temperature sensor 120 is positioned more rearward than the front end 90C of the radiator 90 and more frontward than the rear end 90D of the radiator 90. Thus, the intake air temperature is measured more accurately even when the intake air temperature sensor 120 is disposed near the radiator 90.

In the present preferred embodiment, the upper end 90E of the radiator 90 is positioned more frontward than the lower end 90F thereof. The intake air temperature sensor 120 is disposed in a region rearward of, as viewed from one side of the vehicle, a first linear line S1 connecting the upper end 90E of the radiator 90 and the lower end 90F of the radiator 90 to each other and extending frontward and obliquely upward, and above a second linear line S2 passing through the center of the radiator 90 and extending rearward and obliquely upward perpendicularly to the first linear line S1. Thus, the intake air temperature is measured more accurately even when the intake air temperature sensor 120 is disposed substantially above the radiator 90.

In the present preferred embodiment, the motorcycle 1 includes the head pipe 5. The body frame 50 includes the left main frame 52 extending rearward and obliquely downward from the head pipe 5 and the right main frame 72 extending rearward and obliquely downward from the head pipe 5. The left frame cover 100 is mounted to the left main frame 52. By mounting the left frame cover 100 to the left main frame 52 in this manner, the intake air temperature sensor 120 is disposed at a position to which it is difficult for the heated air to flow.

In the present preferred embodiment, the radiator fan 92 rotates clockwise as viewed from the front of the vehicle, and the motorcycle further includes a fan cover 94, which opens downward and at least a portion of which is positioned above and behind the left portion 92B of the radiator fan 92 as viewed from the front of the vehicle. Thus, the fan cover 94 corresponding to the radiator fan 92 rotating clockwise is provided behind the radiator fan 92. Therefore, the air heated by passing through the radiator 90 is more unlikely to flow toward the intake air temperature sensor 120. As a result, the temperature of the air is measured more accurately.

In the present preferred embodiment, the motorcycle 1 includes the left front fork 9A and the right front fork 9B both mounted to the body frame 50, and the front wheel 10 supported by the left front fork 9A and the right front fork 9B. The radiator fan 92 rotates clockwise as viewed from the front of the vehicle, and the intake air temperature sensor 120 is disposed above the right end 90A of the radiator 90 and rightward of the left front fork 9A as viewed from the front of the vehicle. Thus, the intake air temperature is measured more accurately even when the intake air temperature sensor 120 is disposed near the radiator 90.

In the present preferred embodiment, the radiator 90 is inclined frontward and obliquely upward, and the inclination angle of the radiator 90 from the horizontal is greater than about 45 degrees, for example. When the inclination angle of the radiator 90 from the horizontal is greater than about 45 degrees, the heated air tends to flow upward of the left end 90B of the radiator 90 as viewed from the front of the vehicle (i.e., in the direction indicated by arrow Y1 in FIG. 2) in the case where the radiator fan 92 rotates clockwise. However, the intake air temperature sensor 120 is disposed at a position to which it is difficult for the air heated by passing through the radiator 90 to flow, and therefore, the intake air temperature is measured more accurately.

Second Preferred Embodiment

Figure 11:
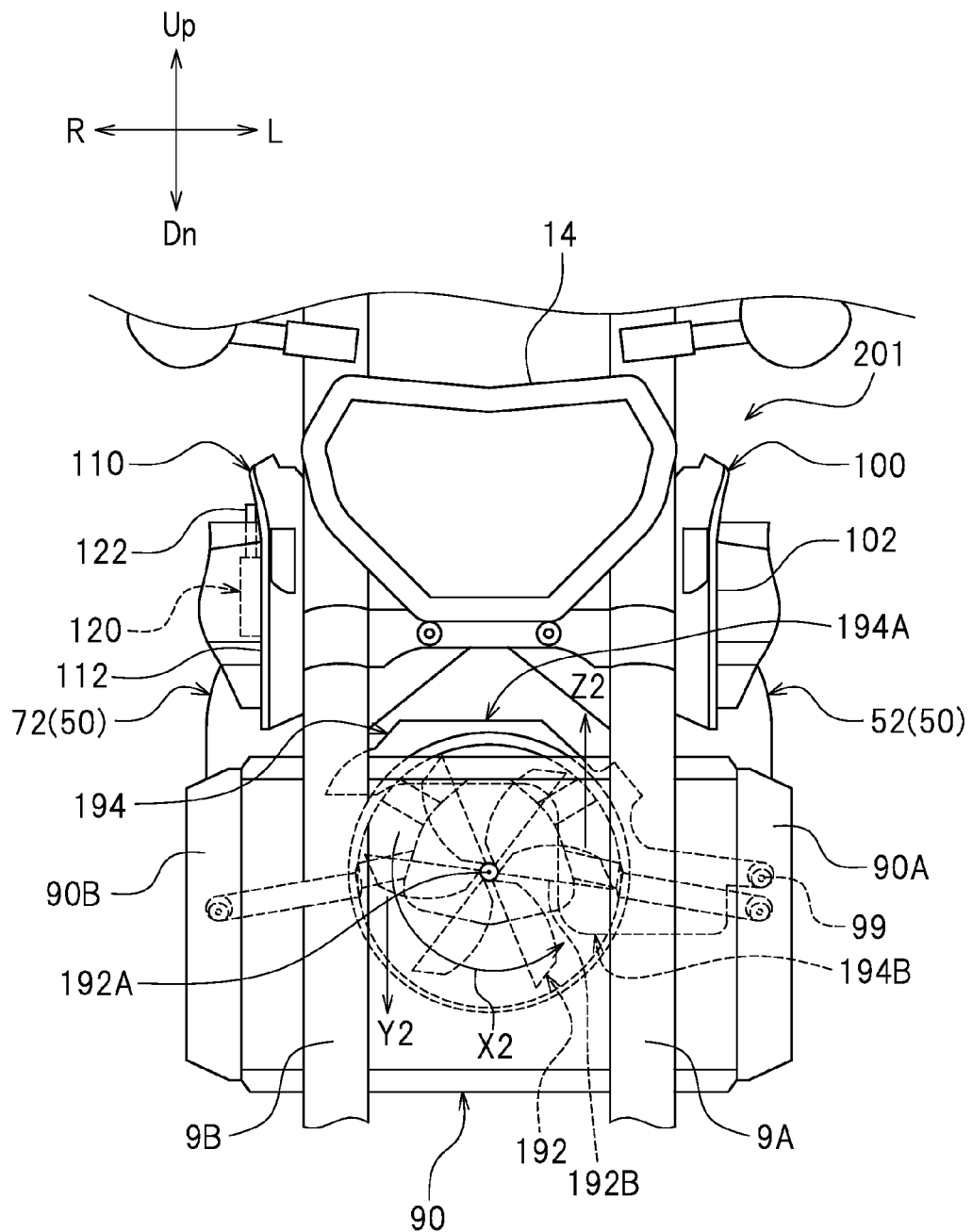
FIG. 11 is a front view illustrating a portion of a motorcycle according to a second preferred embodiment of the present invention.
Figure 12:
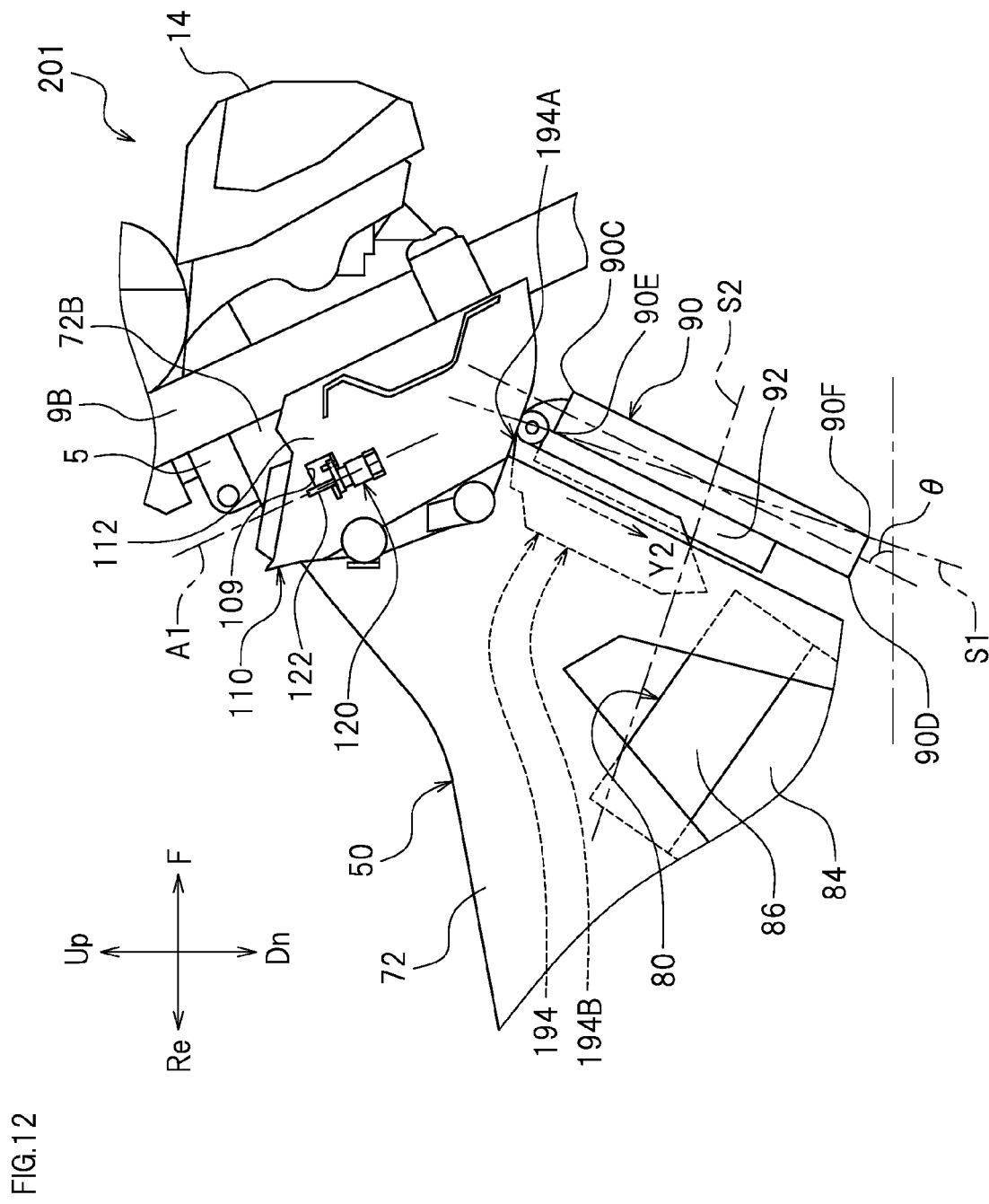
FIG. 12 is a right side view illustrating a portion of the motorcycle according to the second preferred embodiment of the present invention.

FIG. 11 is a front view illustrating a portion of a motorcycle 201 according to a second preferred embodiment of the present invention. FIG. 12 is a right side view illustrating a portion of the motorcycle according to the second preferred embodiment. Note that a right outer cover, which is disposed outward (rightward) of the right frame cover 110, is not shown in FIG. 12.

As illustrated in FIG. 11, a radiator fan 192 rotates counterclockwise as viewed from the front of the vehicle (in the direction indicated by arrow X2 in FIG. 11). Accordingly, the air having been heated by passing through the radiator 90 tends to flow to the left and downward from the radiator fan 192 as viewed from the front of the vehicle (i.e., in the direction indicated by arrow Y2 in FIGS. 11 and 12) and to the right and upward from the radiator fan 192 as viewed from the front of the vehicle (i.e., in the direction indicated by arrow Z2 in FIG. 11).

As illustrated in FIG. 11, a fan cover 194 includes an upper portion 194A positioned above the radiator fan 192, as viewed from the front of the vehicle, and a side portion 194B positioned rightward of the radiator fan 192, as viewed from the front of the vehicle. The upper portion 194A of the fan cover 194 is positioned above and behind the radiator fan 192. The side portion 194B of the fan cover 194 is positioned rightward of and behind the radiator fan 192. The fan cover 194 opens downward. Note that at least a portion of the fan cover 194 is positioned above and behind a right portion 192B of the radiator fan 192. The right portion 192B of the radiator fan 192 includes a portion of the radiator fan 192 that is located more rightward than the center 192A of the radiator fan 192, as viewed from the front of the vehicle. When viewed from the rider of the motorcycle 1, the right portion 192B of the radiator fan 192 is a portion thereof that is located more leftward than the center 192A of the radiator fan 192.

As illustrated in FIG. 11, the intake air temperature sensor 120 is disposed above the left end 90B of the radiator 90 as viewed from the front of the vehicle. The intake air temperature sensor 120 is disposed leftward of the right front fork 9B. As illustrated in FIG. 12, the intake air temperature sensor 120 is disposed more rearward than the front end 90C of the radiator 90 and more frontward than the rear end 90D of the radiator 90. The intake air temperature sensor 120 is disposed in a region rearward of, as viewed from one side of the vehicle, a first linear line S1 connecting the upper end 90E of the radiator 90 and the lower end 90F of the radiator 90 to each other and extending frontward and obliquely upward, and above a second linear line S2 passing through the center of the radiator 90 and extending rearward and obliquely upward perpendicularly to the first linear line S1.

In the motorcycle 201 according to the present preferred embodiment, the radiator fan 192 rotates counterclockwise as viewed from the front of the vehicle (i.e., in the direction indicated by arrow X2 in FIG. 11), and the intake air temperature sensor 120 is positioned above the left end 90B of the radiator 90 as viewed from the front of the vehicle. In this case, the air having been heated by passing through the radiator 90 tends to flow upward of the right end 90A of the radiator 90 as viewed from the front of the vehicle (i.e., in the direction indicated by arrow Z2 in FIG. 11) and downward of the left end 90B of the radiator 90 as viewed from the front of the vehicle (i.e., in the direction indicated by arrow Y2 in FIG. 11)

by the radiator fan 192. However, the intake air temperature sensor 120 is disposed above the left end 90B of the radiator 90, where it is difficult for the heated air to flow. For this reason, when the intake air temperature sensor 120 measures the intake air temperature, the air heated by the radiator 90 has less of an effect on the measured temperature. As a result, the intake air temperature sensor 120 measures the temperature of the air more accurately. Thus, the motorcycle 201 makes it possible to measure the intake air temperature more accurately even when the intake air temperature sensor 120 is disposed near the radiator 90.

In the motorcycle 201 of the present preferred embodiment, the radiator fan 192 rotates counterclockwise as viewed from the front of the vehicle, and the motorcycle 201 includes the fan cover 194, which opens downward and at least a portion of which is positioned above and behind the right portion 192B of the radiator fan 192 as viewed from the front of the vehicle. Thus, the fan cover 194 corresponding to the radiator fan 192 rotating counterclockwise is provided behind the radiator fan 192. Therefore, the air heated by passing through the radiator 90 is more unlikely to flow toward the intake air temperature sensor 120. As a result, the temperature of the air is measured more accurately.

In the present preferred embodiment, the motorcycle 201 includes the left front fork 9A and the right front fork 9B both mounted to the body frame 50, and the front wheel 10 supported by the left front fork 9A and the right front fork 9B. The radiator fan 192 rotates counterclockwise as viewed from the front of the vehicle, and the intake air temperature sensor 120 is disposed above the left end 90B of the radiator 90 and leftward of the right front fork 9B as viewed from the front of the vehicle. Thus, the intake air temperature is measured more accurately even when the intake air temperature sensor 120 is disposed near the radiator 90.

In the present preferred embodiment, the radiator 90 is inclined frontward and obliquely upward, and the inclination angle of the radiator 90 from the horizontal is greater than about 45 degrees, for example. When the inclination angle of the radiator 90 from the horizontal is greater than about 45 degrees, the heated air tends to flow upward of the right end 90A of the radiator 90 as viewed from the front of the vehicle (i.e., in the direction indicated by arrow Z2 in FIG. 11) in the case where the radiator fan 192 rotates counterclockwise. However, the intake air temperature sensor 120 is disposed at a position to which it is difficult for the air heated bypassing through the radiator 90 to flow, and therefore, the intake air temperature is measured more accurately.

It should be noted that in the foregoing preferred embodiments, the fan cover 94 or 194 preferably is disposed behind the radiator fan 92, but the fan cover 94 or 194 need not be disposed behind the radiator fan 92.

Moreover, the intake air temperature sensor 120 may not necessarily be disposed so that the sensor main unit 122 extends rearward and obliquely upward. The sensor main unit 122 may be disposed so as to extend in any direction as long as the sensor main unit 122 is substantially parallel to the surface of the cover main body 102.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motorcycle comprising:
   a body frame;
   an engine supported by the body frame;
   a radiator disposed in front of the engine;
   a radiator fan disposed between the engine and the radiator and configured to pass air through the radiator from a front of the radiator;
   a frame cover disposed above the radiator, the frame cover being mounted to the body frame and covering at least a portion of the body frame, and the frame cover being spaced away from the radiator; and
   an intake air temperature sensor mounted to the frame cover; wherein
   the radiator fan rotates clockwise as viewed from a front of the motorcycle and the intake air temperature sensor is positioned above a right end of the radiator as viewed from the front of the motorcycle, or the radiator fan rotates counterclockwise as viewed from the front of the motorcycle and the intake air temperature sensor is positioned above a left end of the radiator as viewed from the front of the motorcycle.

2. The motorcycle according to claim 1, wherein the intake air temperature sensor is positioned more rearward than a front end of the radiator and more frontward than a rear end of the radiator.

3. The motorcycle according to claim 1, wherein an upper end of the radiator is positioned more frontward than a lower end of the radiator;
   the intake air temperature sensor is disposed rearward of a first linear line, as viewed from a side of the motorcycle;
   the first linear line connects the upper end of the radiator and the lower end of the radiator to each other and extends frontward and obliquely upward, as viewed from the side of the motorcycle;
   the intake air temperature sensor is disposed above a second linear line, as viewed from the side of the motorcycle; and
   the second linear line passes through a center of the radiator and extends rearward and obliquely upward perpendicularly or substantially perpendicularly to the first linear line, as viewed from the side of the motorcycle.

4. The motorcycle according to claim 1, further comprising a head pipe, wherein the body frame includes a main frame extending rearward and obliquely downward from the head pipe, and the frame cover is mounted to the main frame.

5. The motorcycle according to claim 1, wherein the radiator fan rotates clockwise as viewed from the front of the motorcycle; and
   the motorcycle further comprises a fan cover, at least a portion of the fan cover is positioned above and behind a left portion of the radiator fan as viewed from the front of the motorcycle, and the fan cover opens downward.

6. The motorcycle according to claim 1, further comprising:
   a left front fork and a right front fork both mounted to the body frame; and
   a front wheel supported by the left front fork and the right front fork; wherein
   the radiator fan rotates clockwise as viewed from the front of the motorcycle; and
   the intake air temperature sensor is disposed above the right end of the radiator and rightward of the left front fork, as viewed from the front of the motorcycle.

7. The motorcycle according to claim 1, wherein the radiator fan rotates counterclockwise as viewed from the front of the motorcycle; and the motorcycle further comprises a fan cover, at least a portion of the fan cover is positioned above and behind a right portion of the radiator fan as viewed from the front of the motorcycle, and the fan cover opens downward.

8. The motorcycle according to claim 1, further comprising:
   a left front fork and a right front fork both mounted to the body frame; and
   a front wheel supported by the left front fork and the right front fork; wherein
   the radiator fan rotates counterclockwise as viewed from the front of the motorcycle; and
   the intake air temperature sensor is disposed above the left end of the radiator and leftward of the right front fork as viewed from the front of the motorcycle.

9. The motorcycle according to claim 1, wherein the radiator is inclined frontward and obliquely upward, and an inclination angle of the radiator from horizontal is greater than about 45 degrees.

\* \* \* \* \*